Sept. 24, 1968         W. J. BUEHLER ET AL         3,403,238
             CONVERSION OF HEAT ENERGY TO MECHANICAL ENERGY
                       Filed April 5, 1966
Fig. I
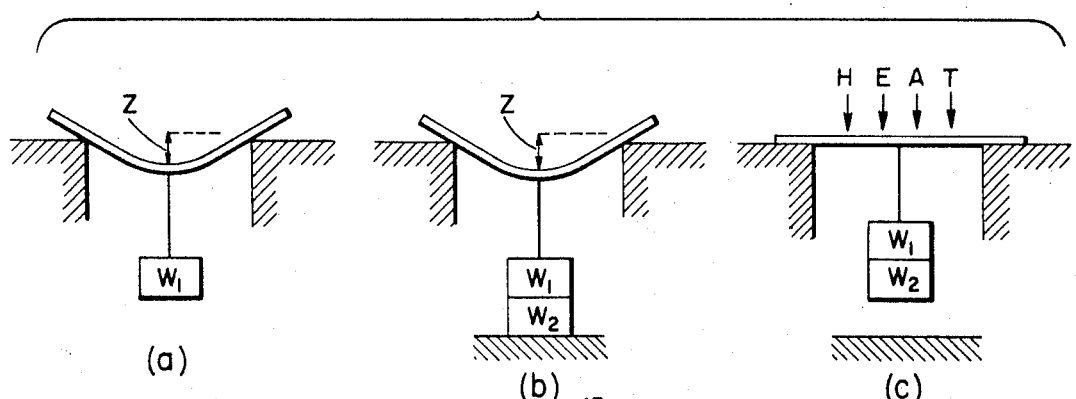
(a)    (b)    (c)
Fig. 2
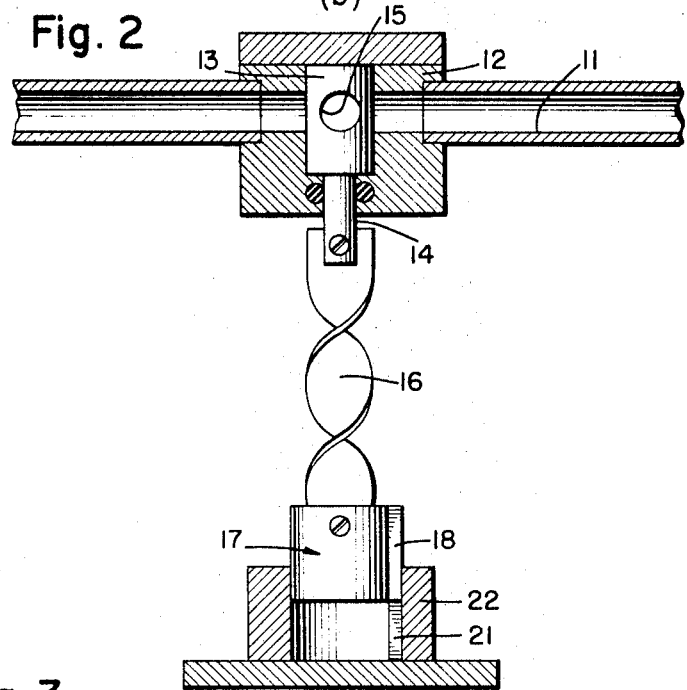
Fig. 3
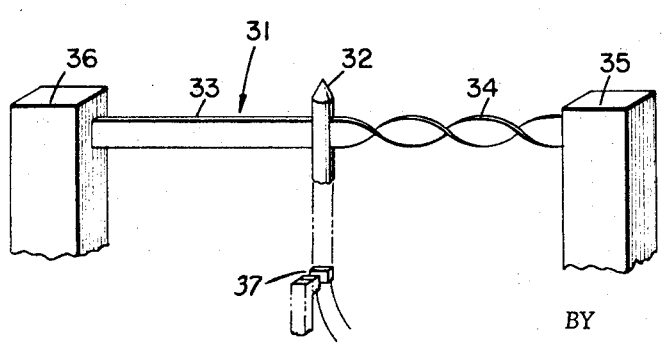
INVENTORS
WILLIAM J. BUEHLER
DAVID M. GOLDSTEIN
BY
*J. O. Tresansky*
ATTORNEY

United States Patent Office 3,403,238
Patented Sept. 24, 1968

3,403,238
CONVERSION OF HEAT ENERGY TO
MECHANICAL ENERGY
William J. Buehler, Bethesda, and David M. Goldstein,
Adelphi, Md., assignors to the United States of America
as represented by the Secretary of the Navy
Filed Apr. 5, 1966, Ser. No. 540,422
10 Claims. (Cl. 337—393)

ABSTRACT OF THE DISCLOSURE

A method for converting heat energy into mechanical energy which includes, deforming a TiNi alloy, having a 53.5–56.5% by weight nickel content, below its critical temperature and thereafter heating said TiNi alloy to a temperature above its critical temperature.

---

The invention described herein may be manufactured and used by or for the Government of the United States of America for governmental purposes without the payment of any royalties thereon or therefor.

This invention is directed to the conversion of heat energy into mechanical energy and more particularly to the use of an alloy for performing useful work.

To date, one of the most useful devices for the direct conversion of heat into mechanical energy is the bimetallic couple wherein two metals of dissimilar thermal expansions are bonded together. Although the bimetallic couple appears to perform the thermo-mechanical transition efficiently, it has certain obvious limitations, with the most serious being, the limited mechanical deflection per degree temperature change, the very low useful energy available for doing work and the constant (linear) change in mechanical deflection with temperature variation.

Accordingly, it is an object of this invention to provide a means for directly converting heat energy into mechanical energy.

It is another object of this invention to provide a means for reversibly converting heat energy into mechanical energy.

It is a further object of this invention to provide a more efficient means of converting heat energy into mechanical energy.

It is still another object of this invention to provide an improved temperature sensitive device.

These and other objects will become more fully apparent from reading the following detailed description of the invention wherein:

FIG. 1 is a diagrammatic representation of the conversion of heat energy into mechanical energy;

FIG. 2 is a side view of a temperature responsive device; and

FIG. 3 is a perspective view of the device for reversibly converting heat energy into mechanical energy.

The objects of this invention are accomplished by utilizing a near stoichiometric nickel-titanium alloy (53.5–56.5 weight percent nickel with the remainder being essentially titanium and hereinafter called TiNi) to convert heat energy to mechanical energy. The invention will be more fully described in the light of the following background information.

This invention is based upon the finding that TiNi will undergo a martensitic (diffusionless) transition with the ability of the alloy to undergo such a transition being temperature dependent. The maximum temperature at which this transition can occur is called the critical temperature and this temperature is a function of the alloy composition. Some typical alloy compositions and their approximate critical temperatures which were obtained from a damping transition curve are given in the following table:

| Alloy composition wt. percent nickel: | Critical temp. ° C. |
|---|---|
| 53.5 | 98 |
| 54.0 | 140 |
| 54.5 | 170 |
| 55.0 | 140 |
| 55.5 | 30 |
| 56.0 | −25 |
| 56.5 | −50 |

The martensitic transition may be produced by deforming TiNi below its critical temperature and this transition, due to the structural change taking place in the molecules, is accompanied by the liberation of heat energy. It has been found that if the TiNi is now heated in its deformed condition to above its critical temperature, it will move in a direction opposite to the direction in which it has been deformed and during this movement the TiNi is capable of producing useful work. In particular, the heat energy which is utilized in causing the alloy to revert to the molecular state in which it was prior to the transition is converted into mechanical energy and this mechanical energy far exceeds the amount of mechanical energy originally utilized in deforming the alloy. It is to be understood that the term "TiNi deformed below its critical temperature" is used in this application to represent a shape different than the shape of the alloy above its critical temperature and thus it includes, for example, straightening a twisted piece of TiNi below its critical temperature.

Thus, in particular the invention in one aspect involves deforming TiNi below its critical temperature and then heating the alloy in its deformed condition to above its critical temperature, with the heating causing the alloy to move in a direction opposite to the direction in which it has been deformed. Thus in FIG. 1 (Panel $a$) there is shown a TiNi strip having a critical temperature above room temperature which has been deflected at room temperature an amount Z by a weight $W_1$. A second weight $W_2$ (Panel $b$) is added while maintaining the amount of deflection Z constant and then the TiNi is heated (Panel $c$) to above its critical temperature at which point it returns to its approximate original zero deflection position. The amount of useful work performed ($W_1Z+W_2Z$) is greater than the work expended ($W_1Z$) in producing the deformation and thus TiNi is an extremely effective means for converting heat energy into mechanical energy.

Since the ability of a particular TiNi alloy composition to produce useful work is dependent upon a "triggering" temperature (critical temperature) and since no movement or useful work will be performed until this temperature is attained, TiNi may be utilized as a temperature sensitive actuating device. For example, in FIG. 2 there is shown a pipe 11 having a valve seat 12 into which there is fitted a valve 13 (shown in closed position) having a bore 15 and a valve stem 14. The valve stem 14 is fixedly connected to a TiNi sensor 16 which has been twisted below its critical temperature in a direction such that a straightening of the sensor will rotate the valve to an open position. The sensor 16 is connected to a block 17 having a key 18 which fits into keyway 21 in slide 22 in order to prevent block 17 from rotating while permitting it to move in a vertical direction. In operation, as soon as the TiNi sensor 16 is heated above its critical temperature, it will rotate in a direction opposite to the one in which it has been twisted which in turn will rotate valve 13 in seat 12 to an open position, permitting fluid to flow through pipe 11. It should be readily apparent that such a device has many uses, for example, as a control for a fluid sprinkling system, with the TiNi alloy composition being chosen so that its critical temperature will correspond to the temperature at which actuation of the device is desired.

The unique properties of TiNi may also be utilized for reversibly converting heat energy to work energy by carefully manipulating the martensitic transition factors. In FIG. 3 there is shown a strip of TiNi 31 constrained between two immovable posts 35 and 36 having a straight portion 33, a portion 34 twisted below the critical temperature, and a pointer 32 mounted between the two portions in order to index rotational movement. In order to achieve a reversible operation, section 34 is heated above the critical temperature of the alloy while maintaining section 33 below the critical temperature thereby causing section 34 to straighten, rotating pointer 32 in a given direction and further causing section 33 to become twisted. By reversing the above procedure and heating section 33 above the critical temperature while maintaining the now straightened section 34 below the critical temperature, the pointer 32 will rotate in a direction opposite to the first direction, once again twisting section 34 and straightening section 33. This procedure for reversibly converting heat energy into mechanical energy may be utilized, for example, for remotely controlling a switch. Thus by properly manipulating the heating of sections 33 and 34, element 32 which is shown in the figure as a pointer, may be utilized for opening and closing the contacts of a switch element 37.

The principle advantage of the present invention over bimetallic composites is that it produces more useful work per unit weight of metal. This property may be utilized for forming prefabricated structures of TiNi; e.g., a TiNi structure may be compressed below its critical temperature, shipped to a desired location, and then heated above its critical temperature whereby the structure now assumes its original shape. For this purpose a TiNi alloy having a critical temperature below room temperature (56.0–56.5 weight percent nickel) is preferred since these alloys have better structural properties at temperatures above their critical temperature. It should be readily apparent that in using these alloys, the structure will have to be compressed and shipped under low temperature conditions and then brought to a higher temperature; e.g., room temperature, to restore the original shape.

Another advantage of the present invention is that unlike bimetallic composites which work linearly with temperature change and require considerable heat to effect their movement and working potential, TiNi has a fairly critical "triggering" temperature and thus requires minimum heating to do considerable useful work. In this regard TiNi comprising 53.5–55.5 weight percent nickel with the remainder being essentially titanium is preferred since the critical temperature of these alloys is above room temperature.

Obviously many modifications and variations of the present invention are possible in the light of the above teachings. It is therefore to be understood, that within the scope of the appended claims, the invention may be practiced otherwise than as specifically described.

What is claimed is:

1. A method for converting heat energy to mechanical energy which comprises heating an alloy comprising 53.5–56.5 weight percent nickel the remainder being essentially titanium, to a temperature above its critical temperature, said alloy having been previously deformed below its critical temperature, said heating causing said alloy to move in a direction opposite to the direction in which it has been deformed.

2. The method of claim 1 wherein said alloy comprises 53.5–55.5 weight percent nickel with the remainder being essentially titanium.

3. The method of claim 2 wherein the alloy has been deformed by twisting.

4. The method of claim 1 wherein said alloy comprises 56.0–56.5 weight percent nickel with the remainder being essentially titanium.

5. A temperature responsive device comprising a temperature sensitive means, a means to be actuated by said temperature sensitive means and means operatively connecting the temperature sensitive means and said means to be actuated, said temperature sensitive means being a nickel titanium alloy comprising, 53.5–56.5 weight percent nickel the remainder being essentially titanium, which has been deformed below its critical temperature, whereby heating of said alloy above its critical temperature moves said temperature sensitive means resulting in movement of said means to be actuated.

6. The temperature responsive device of claim 5 wherein said alloy comprises 53.5–55.5 weight percent nickel the remainder being essentially titanium.

7. The temperature responsive device of claim 6 wherein said means to be actuated is a valve and said alloy has been deformed by twisting whereby heating above the critical temperature rotates said valve.

8. A reversible process for converting heat energy to mechanical energy which comprises
   (a) heating a nickel titanium alloy comprising 53.5–56.5 weight percent nickel the remainder being essentially titanium, which is constrained on both ends to a temperature above its critical temperature on a first end while maintaining the alloy below its critical temperature on the other end, the end being heated having been previously twisted below its critical temperature, said heating causing said alloy to rotate in one direction and become twisted on said other end while straightening said first end and
   (b) heating said other end of the alloy to above the critical temperature while maintaining said first end below the critical temperature thereby causing said alloy to rotate in a direction opposite to said first direction.

9. The process of claim 8 wherein said alloy comprises 53.5–55.5 weight percent nickel with the remainder being essentially titanium.

10. The process of claim 8 wherein said movement opens and closes the contacts of a switch.

References Cited

UNITED STATES PATENTS 3,174,851    3/1965    Buehler et al. _____ 75—170

DAVID SCHONBERG, *Primary Examiner.*

WILLIAM HENRY II, *Assistant Examiner.*